United States Patent [19]
Senaratne

[11] Patent Number: 5,303,531
[45] Date of Patent: Apr. 19, 1994

[54] PACKAGING MACHINE

[75] Inventor: Gane Senaratne, Rancho Palos Verdes, Calif.

[73] Assignee: Doboy Packaging Machinery, Inc., New Richmond, Wis.

[21] Appl. No.: 836,791

[22] Filed: Feb. 14, 1992

[51] Int. Cl.⁵ .............................................. B65B 35/36
[52] U.S. Cl. ..................................... 53/448; 53/247; 53/251; 53/260; 53/539
[58] Field of Search ................. 53/251, 252, 250, 247, 53/260, 255, 539, 543, 544, 448, 443, 473

[56] References Cited

U.S. PATENT DOCUMENTS

| | | | |
|---|---|---|---|
| 3,288,088 | 11/1966 | Leedy . | |
| 3,574,986 | 4/1971 | Dieter | 53/252 |
| 3,786,617 | 1/1974 | Fluck | 53/154 |
| 4,030,268 | 6/1977 | Payne | 53/55 |
| 4,048,783 | 9/1977 | Raudat et al. | 53/544 X |
| 4,051,652 | 10/1977 | Hirano et al. | 53/544 X |
| 4,686,813 | 8/1987 | Sawada | 53/544 X |
| 5,060,455 | 10/1991 | Schmeisser | 53/247 X |

Primary Examiner—James F. Coan
Attorney, Agent, or Firm—Haugen and Nikolai

[57] ABSTRACT

A packaging apparatus and method for packaging objects in such a way as to ensure that the article will not be damaged. Objects to be packaged are gripped by a plurality of pairs of vertically oriented gripping fingers each having inflatable bladders therein. The inflated bladders engage the objects with a predetermined low pressure sufficient to grasp and secure the objects. The plurality of fingers with objects gripped therein therebetween are then moved to place the objects in packaging containers. A vacuum is drawn on the inflated bladders, releasing the objects into the packaging container.

15 Claims, 4 Drawing Sheets

PACKAGING MACHINE

BACKGROUND OF THE INVENTION

This invention relates to packaging machinery and more particularly to an apparatus and method for lightly gripping items, such as sticky and delicate food items and food items with irregular or unpredictable shapes to be packaged in a way that preserves the integrity and appearance of the item.

It is well-known in the packaging machinery field that such items, such as sticky, delicate and irregularly or unpredictably shaped food items, present problems in handling and wrapping. Previous methods have involved conveyor mechanisms for carrying the items to a pivotally mounted plate wherein a cam actuated mechanism tilts the plate depositing the food item onto trays or into cartons located on a second conveyor system beneath the first conveyor system. Such an apparatus can be found in U.S. Pat. No. 4,030,268 to Payne.

Side-by-side conveyors are known in the art and vary from transversely located conveyors as in U.S. Pat. No. 3,574,986 to Dieter to lateral conveyors as in U.S. Pat. No. 3,288,088 to Leedy.

Sweeping the item to be packaged into the packaging container is also known in the art. U.S. Pat. No. 3,574,986 to Dieter shows such a device for packaging items such as bottles or jars. However, the bottles or jars do not need the careful handling that food items such as most donuts or pastries or other fragile articles may require to preserve their integrity and appearance.

Another type of packaging device known in the art utilizes a vacuum system and two lateral conveyors. One conveyor carries baking pans and rolls to the loading station and the other conveyor carries preassembled cartons or containers to the loading station zone. A transport mechanism having a plurality of suction cups depending therefrom engages the tops of the rolls and moves them upward out of the pan. The transport mechanism moves laterally on a pair of overhead ways to the packing zone where it moves the rolls downward into the preassembled container. The vacuum is then broken releasing the rolls.

Problems arise with these apparatuses. Sliding food off a conveyor is difficult with sticky food. Vacuum systems are not appropriate for items such as donuts wherein the hole will not allow a proper suction. In addition the shape or structure of other delicate items to be packaged may prohibit the use of a vacuum system. What is, therefore, needed is a packaging apparatus which grips the article to be packaged in such a way as to ensure that it will not be damaged. As such, a device which lightly grips the article with pneumatically padded fingers achieves the desired result.

The primary object of the invention is to provide a device which lightly grips items during transport during a packaging operation.

Another object is to utilize computer controlled pneumatic robotics for finger grippers used to move the articles from a production line to a packaging line.

Yet another object is to provide vertically pneumatic padded gripper fingers for gripping delicate items to be wrapped.

SUMMARY OF THE INVENTION

The invention comprises two side-by-side belt conveyors, one for carrying the food items, such as donuts from a supply and the other carrying boxes in which they are ultimately to be placed. While the preferred embodiment will be described in an application relating to the packaging of a confectionery item such as donuts, those skilled in the packaging machine art will appreciate that the invention can find broader use in handling other delicate and irregularly shaped articles. The donuts may come down the first conveyor in stacks of two from a coating station while open top boxes come down the second conveyor. The boxes are stopped by a pneumatically actuated rod crossing the second conveyor. When a predetermined number, e.g. four, two high stacks of donuts have reached a stop, a computer controlled pneumatic system causes a set of vertically oriented fingers having soft pneumatic pads or bladders to move toward the center of the first conveyor and once in position, the pads are inflated to increase their size, thereby gripping the irregular shaped donuts between opposed finger pairs. Next, the side wall guides on either side of the first conveyor drop out of the way. The fingers grasping the donuts rise first vertically and then are transported laterally to the second conveyor and positioned over the open top of a box. Finally, a vacuum is drawn on the pneumatic pads lining the fingers to collapse them as a set of pushers move vertically downward to thereby release the donuts from the fingers and deposit the plural, two-high stacks in the box. Once the donuts have been deposited, a valve is operated to withdraw the box stop rod, allowing the box to move down stream to the box wrapper station.

DESCRIPTION OF THE DRAWINGS

These and other objects of the invention will become more readily apparent from the following detailed description taken in conjunction with the accompanying drawings in which.

DESCRIPTION OF THE PREFERRED EMBODIMENT

Figure 1:
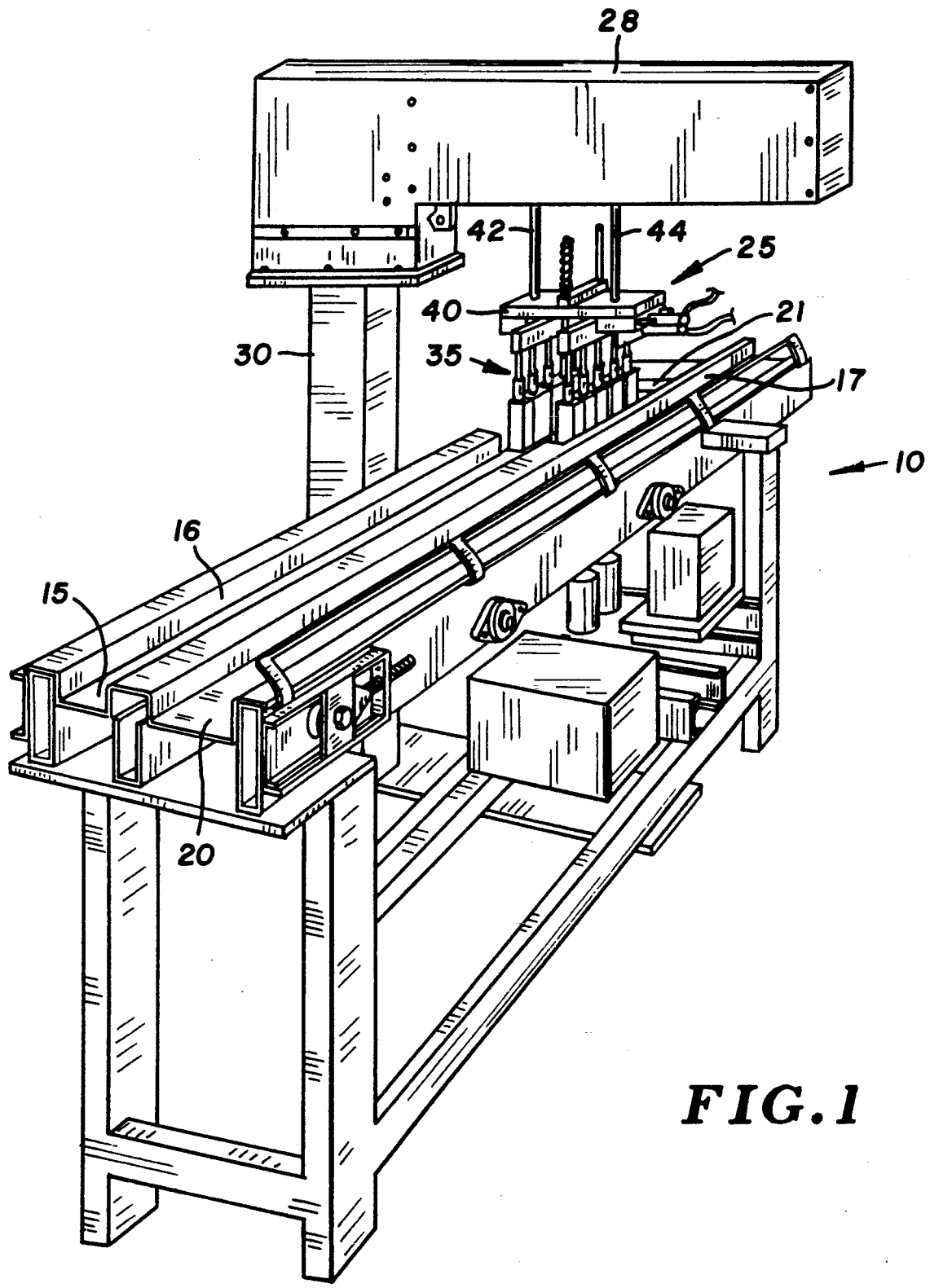
FIG. 1 is a perspective view of the donut packaging machine in accordance with the invention.
Figure 2:
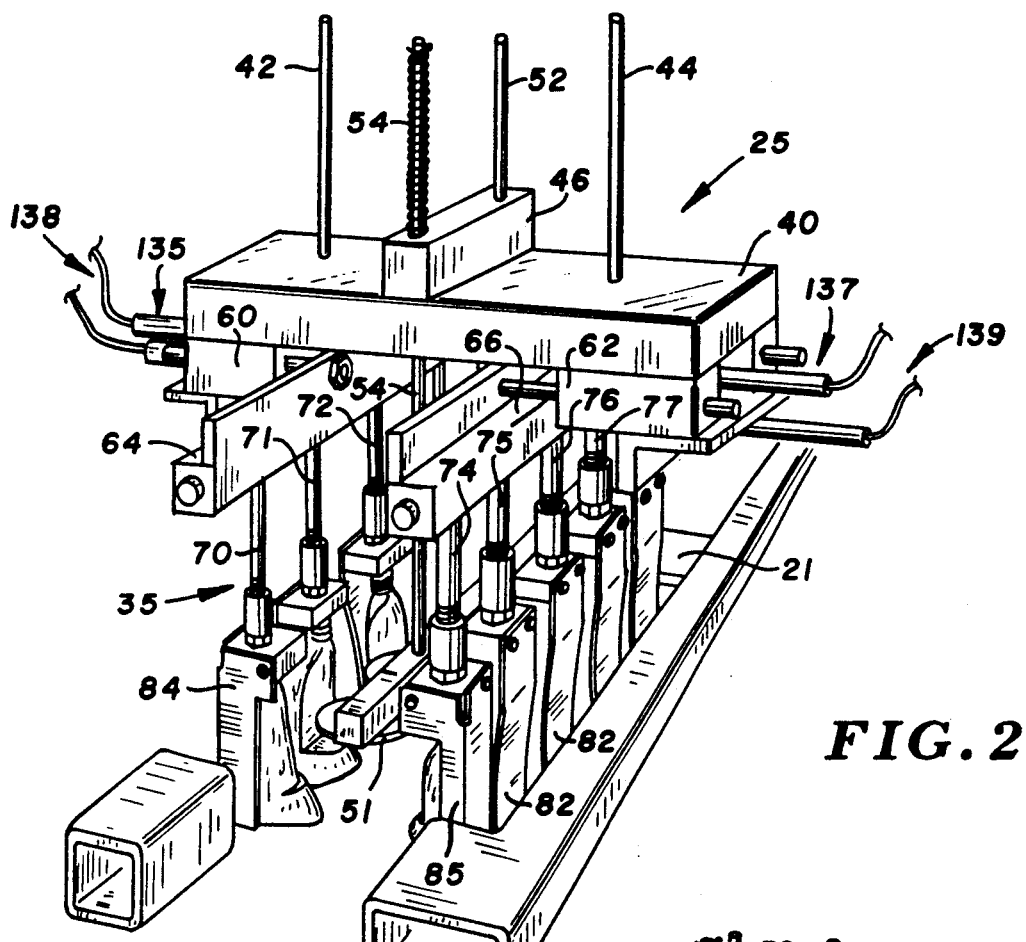
FIG. 2 is a partial perspective view of the transport head assembly of the system of FIG. 1.
Figure 3:
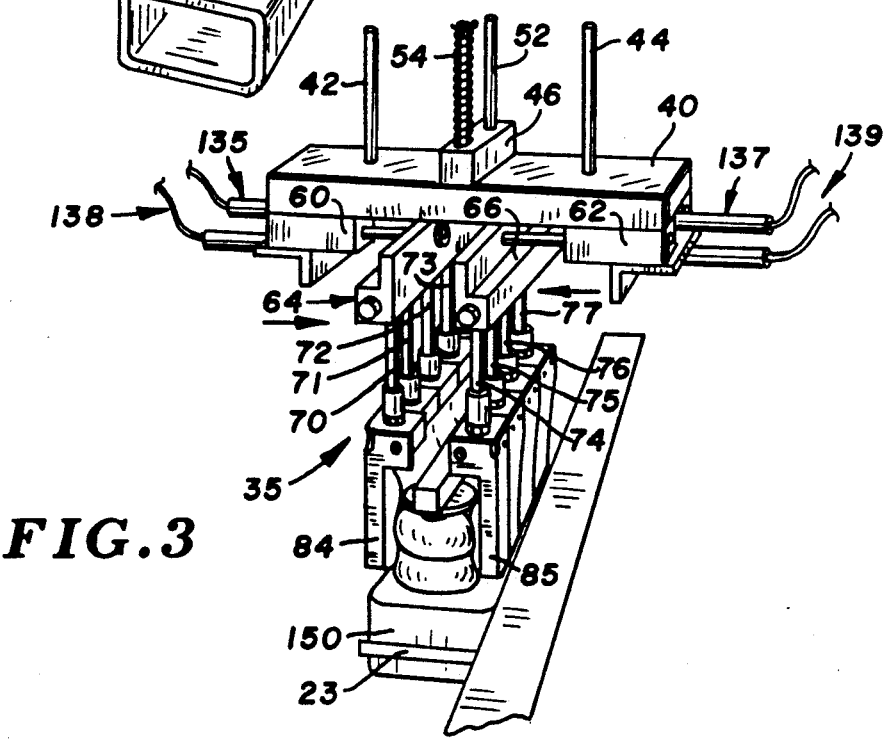
FIG. 3 is a perspective view of the transport head assembly with donuts to be packaged grasped between opposed pneumatic finger pairs.

As shown in FIG. 1, a packaging station, located generally at 10, has two side-by-side conveyors 15 and 20 for conveying objects to be packaged and the containers in which the objects are to be packaged, respectively. The side wall guides 16 and 17 of conveyors 15 and 20 contain stop bars 21 and 23 extending across the belts of the conveyors as seen in FIGS. 1, 2 and 3. The side guide walls of conveyor 15 at the packaging station 10 are capable of moving below the conveyor. An overhead product transport assembly 25 suspended from a support arm 28 provides the means to transport the objects to be packaged laterally from first conveyor 15 to a location above second conveyor 20 carrying the packaging containers. Standard 30 is located adjacent to the conveyor assemblies and support arm 28 extends laterally from the standard 30 so as to be disposed above the first conveyor 15 and second conveyor 20.

The overhead transport assembly shown generally at 25 in FIG. 1 includes a plurality of downwardly depending finger pairs indicated generally by numeral 35. Because the inventive features of the invention are considered to reside in the assemblies 25 and 35, particular attention will now be devoted thereto.

Referring now to FIGS. 2 and 3 the transport head assembly 25 has a generally U-shaped platform 40. Rods 42 and 44 extend from first platform into support arm 28 (FIG. 1). Rods 42 and 44 are connected Within support arm 28 to the mechanism (not shown) for lateral movement of the transport head assembly 25. Member 46 is located on the upper surface of platform 40. Two additional rods 52 and 54 extend from member 46 toward the support arm. As will be further explained, these rods are part of pusher assembly 50. Rods 52 and 54 also extend below platform 40 and are connected to a pusher plate 51 affixed to the rods.

The lower portion of U-shaped platform 40 has interior walls 60 and 62. Clamping bars 64 and 66 are located adjacent to and parallel with interior walls 60 and 62. The clamping bars are connected to pneumatic cylinders shown generally at 135 and 137 in FIGS. 2 and 3. The pneumatic cylinders are connected to the pneumatic system by hoses shown generally at 138 and 139 in FIGS. 2 and 3.

The clamping bars are free to reciprocate laterally under pneumatic control. In a first or open position, clamping bar 64 closely abuts interior wall 60 and clamping bar 66 closely abuts interior wall 62. In a second or closed position the clamping bars are moved toward one another as shown in FIG. 3.

Depending from each clamping bar is a plurality of vertically oriented fingers indicated generally at 35. As shown in FIGS. 2 and 3 each individual finger device is attached to clamping bars 64 and 66 by vertically disposed support rods 70–77.

Figure 4:
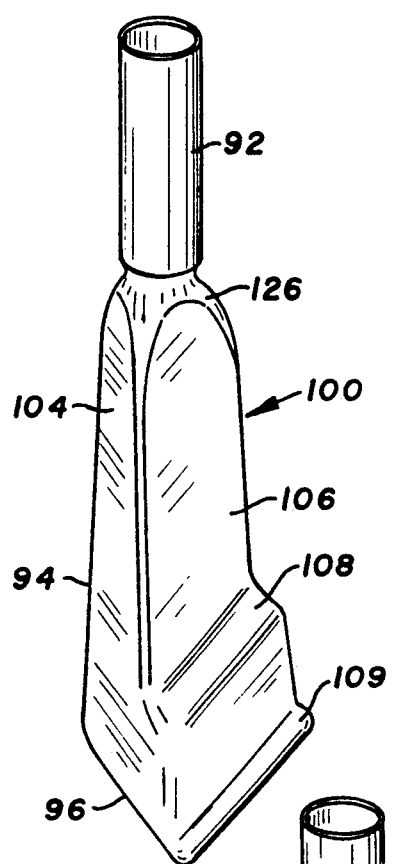
FIG. 4 is a perspective view of a typical bladder used in the pneumatic fingers.
Figure 6:
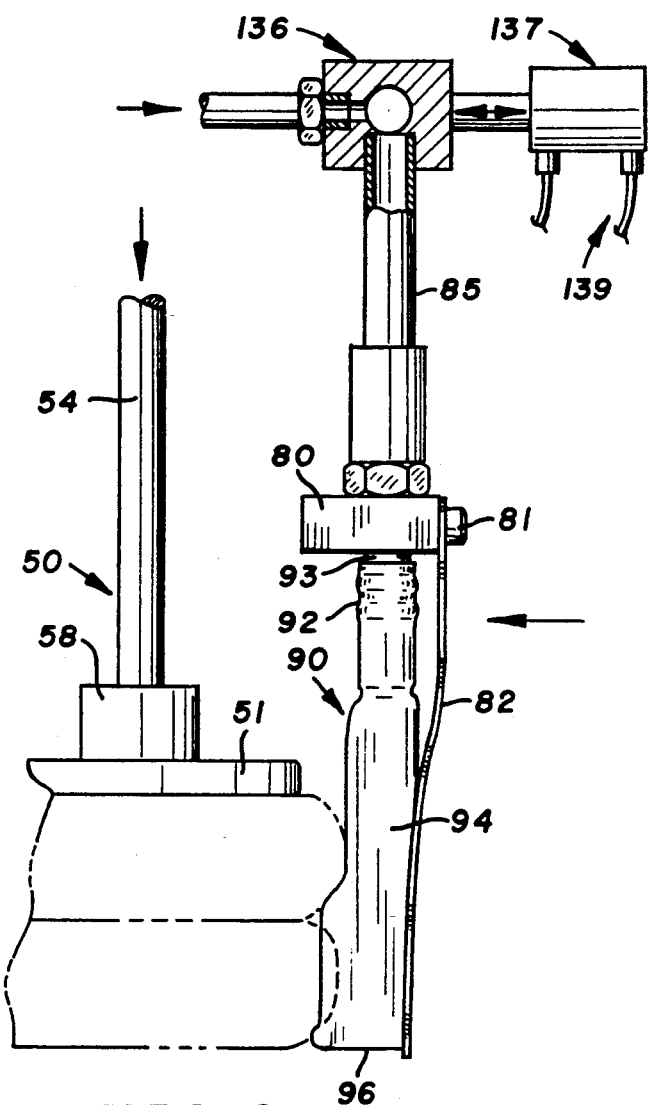
FIG. 6 is a partial front view of the finger and pusher assembly of the invention cooperating with an object to be packaged.
Figure 5:
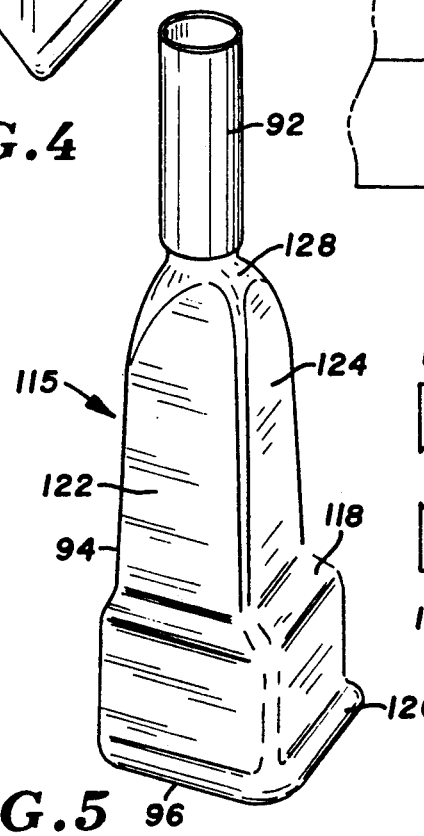
FIG. 5 is a perspective view of another style of the bladder.

Referring now to FIG. 6 which shows a typical finger assembly, each finger has a horizontal upper plate 80 and a backing spring plate 82 affixed to it by bolts 81. Backing spring plate 82 extends down from the horizontal upper plate 80 along the exterior rear surface of bladder 90. The bladder itself as shown in FIGS. 4, 5 and 6, has a throat 92, body 94 and base 96. Throat 92 surrounds a pneumatic system port 93 located on the end of tubular support rod 85 which passes through the horizontal upper plate 80. Port 93 provides fluid for inflating the bladder or provides a vacuum for removing fluid thereby deflating the bladder. FIGS. 2, 4, 5 and 6 show the bladders deflated. FIG. 3 shows inflated bladders engaging donuts. The walls of the bladders bow out when inflated. Additionally, the end finger bladders have a side plate as shown at 84 and 85 in FIGS. 2 and 3.

There are two arrangements for the bladder 94 depending upon the position in the group. Each is a generally tetrahedral shape. The first design is identified by numeral 100, shown in FIG. 4, and has a bottom planar surface in the general shape of a right triangle. The base portion 96 is larger than the main body portion 104. Surface 106 will contact the item to be packaged and is slightly wider along the bottom approximate one-third of the bladder creating an edge 108. The base 96 also extends past the wider bottom of the bladder to form lip 109. The second design 115, in FIG. 5, has a bottom planar surface 96 in the general shape of an isosceles triangle. It also has a base slightly larger than the top portion of the body creating an edge 118 and lip 120. The edge 118 and lip 120 are located on surfaces 122 and 124 which contact the item to be packaged. Each bladder has a rounded edge at the top as at 126 in FIG. 4 and 128 in FIG. 5 which tapers into the throat 92.

Pusher assembly 50 consists of rods 52 and 54 which extend from the transport head assembly 25. Located at the lower end of rods 52 and 54 is a member 58 to which a product engaging plate 51 is attached. In the particular embodiment shown, plate 51 has the general shape of the cross-section of the objects to be packaged, e.g., donuts. Any shape suitable for the objects being packaged may be used.

Figure 8:
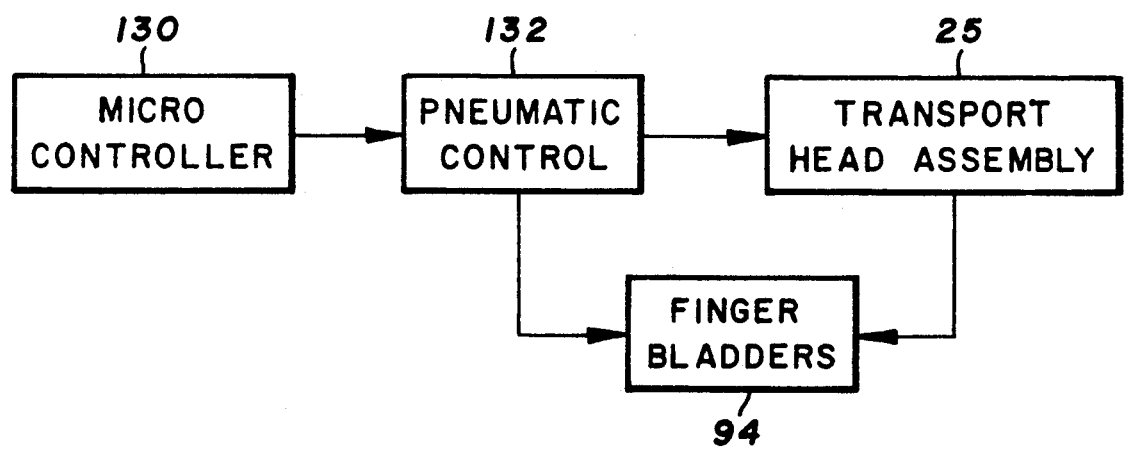
FIG. 8 is a block diagram of control system for the machine of FIG. 1.

As shown by the block diagram of FIG. 8 a microprocessor controls the pneumatic operations of the apparatus. The microprocessor-based microcontroller 130 is connected to the pneumatic control 132 which, in turn, is connected to the transport head assembly 25. The pneumatic control 132 is operatively coupled to the finger bladders directly and to the transport head assembly. Cylinders 135 and 137 (FIGS. 2 and 3) provide the reciprocal movement of the clamping bars 64 and 66 and are located in a rectangular opening 136 defined in the U-shaped platform 40. Each clamping bar is hollow and acts as a manifold providing air to each support bar's port and respective bladder as shown generally at 136 in FIG. 6. The lateral reciprocal movement of the clamping bars 64 and 66, the lateral and vertical movement of the transport head assembly 25 and the vertical movement of the pusher assembly 50 are all ideally pneumatically controlled. However, any other suitable control system such as electrical solenoids or hydraulic cylinders may be utilized.

Figure 7:
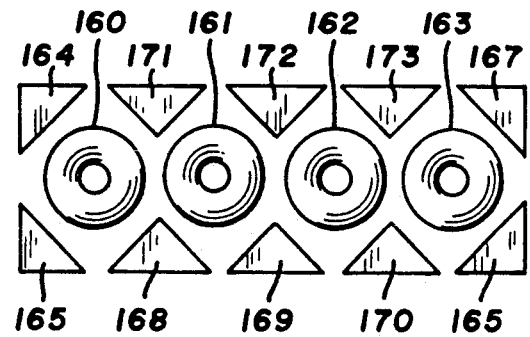
FIG. 7 is a schematic showing the arrangement of bladders about the objects to be packaged of the preferred embodiment.

Donuts to be packaged travel down the first conveyor 15 to the transfer point. The donuts may be in stacks of two. The donuts riding on the conveyor break a light beam or trip a switch (not shown) just prior to reaching the packaging station. After a preset number of stacks of donuts have gone by the light beam or switch, the side guide walls are lowered and the conveyor stops the preset number of donuts just beneath transport head assembly 25. Clamping bars 64 and 66 are initially in their open position abutting the interior walls 60 and 62. The support bars 70–73 and the plurality of fingers 35 suspended therefrom surround the donuts but are in non-contacting relation. Fluid enters the bladder by way of ports on the tubular support rods 70–76 and inflate the bladders. The clamping bars 64 and 66 move to the closed position as shown in FIG. 3. The inflated bladders engage the donuts with a evenly applied predetermined low pressure just sufficient to grasp and secure the donuts as shown in FIG. 3. FIG. 7 is a schematic, sectional view showing how the two styles of the bladders are arranged to best secure each stack of donuts 160–163. Bladders, like those of FIG. 4, are located at each corner as at 164–167. These bladders contact the end donut stacks 160 and 163. Bladders like those of FIG. 5 are located at 168–173. These latter bladders each contact two adjacent stacks of donuts. The transport head assembly 25 next moves the fingers 35 vertically with the donuts secured between the fingers. The transport head assembly 25 along with the plurality of fingers 35 and donuts are pneumatically driven laterally towards the second conveyor 20 and above the open topped container 150. The packaging container 150 had previously moved down second conveyor 120 and was stopped by a rod or bar (not shown) extending across the path of travel. The transport head assembly 25 stops when the donuts in the plurality of fingers 35 are disposed directly above the packaging container 150. Next, the donuts and plurality of fingers 35 are lowered into the packaging container 150. The inflation fluid is now withdrawn from the bladders, shrinking their size and releasing the grip on the donuts. The donuts may still remain attached to the plurality of bladders because of their sticky consistency. The pusher assembly 50 is now made to move downward against the top of the stacks to force the donuts which may be adhered on bladders, as shown in FIGS. 3 and 6, depositing them into packaging container 150.

The plurality of fingers 35 and pusher assembly 50 are subsequently raised vertically and the stop bar 23 is retracted, allowing container 150 with the donuts to move down the second conveyor 20 to a wrapper station. The transport head assembly 25 returns to its position over first conveyor 15 as a new box travels down the second conveyor 20. Another set of donuts to be packaged moves down first conveyor 15.

It is understood that the above disclosure of the presently preferred embodiment is to be taken as illustrative of the invention. The invention may be readily adapted to package other types of objects. Furthermore, it is to be understood that those skilled in the art be capable of making modifications without departing from the true spirit and scope of the invention.

I claim:

1. A packaging apparatus comprising:
   (a) a first endless conveyor for conveying items to be packaged;
   (b) a second endless conveyor laterally offset from said first conveyor for conveying packaging containers, said containers having open tops;
   (c) a transport head assembly disposed overhead relative to said first and second endless conveyor; and
   (d) a plurality of vertically oriented finger assemblies each having inflatable bladders, said finger assemblies depending from said transport head assembly and cooperating for releasably conforming to a surface configuration of said items to be packaged, said transport head assembly having means for lateral and vertical reciprocating movement of said finger assemblies whereby items on said first conveyor can be transported to said containers on said second conveyor and released.

2. Apparatus of claim 1 wherein said finger assemblies conform said surface configuration of said items to be packaged with a evenly applied low pressure.

3. Apparatus of claim 2 wherein first endless conveyor has a stop for the items to be packaged.

4. Apparatus of claim 3 wherein second endless conveyor has a packaging container stop.

5. Apparatus of claim 1 wherein said bladders of said finger assemblies are pneumatically controlled.

6. Apparatus of claim 1 wherein a vertical reciprocating pusher assembly for removing item from said bladders of said finger assemblies depends from said transport head assembly, said transport assembly having means for vertical reciprocation of said pusher assembly.

7. A method for packaging objects into packaging containers comprising the steps of:
   (a) spacing a series of said objects in a predetermined, fixed orientation relative one to the other on a first conveyor;
   (b) moving a series of packaging containers to a stop position on a second conveyor located laterally from first conveyor;
   (c) lowering a plurality of finger-like bladders from a transport head assembly located above said first and second conveyors to a position proximate said objects on said first conveyor;
   (d) inflating said plurality of bladders such that pairs of said bladders partially surround said objects to be packaged, said objects to be packaged being gripped by said bladders with an evenly applied low pressure;
   (e) positioning said plurality of bladders with the objects to be packaged grasped thereby over one of said packaging containers on said second conveyor by vertical and lateral movement of said transport head assembly;
   (f) lowering said plurality of bladders with objects to be packaged relative to said one packaging container; and
   (g) deflating said plurality of bladders to release said objects to be packaged into said one packaging container.

8. The method as in claim 7 and further including the steps of:
   (a) raising said plurality of bladders from said one packaging container; and
   (b) selecting another series of objects to be packaged.

9. A method of transporting objects to be packaged in a packaging machine comprising the steps of:
   (a) positioning said objects individually between at least two uninflated bladders;
   (b) inflating said bladders to cause said bladders to releasably conform to and lightly grip a surface configuration of said objects to be packaged;
   (c) moving the inflated bladders and objects held thereby to a desired location; and
   (d) deflating said inflated bladders to release said object.

10. An article conveying apparatus comprising:
    (a) a transport assembly capable of first movement between first and second locations;
    (b) a plurality of fingers depending from said transport assembly each finger including an inflatable bladder; and
    (c) control means operatively coupled to said transport assembly and said inflatable bladders for first positioning said fingers to the point where they cooperate to conform to a surface configuration of said articles when at said first location, then inflating said bladders sufficiently to apply an even low pressure to said articles, subsequently moving said transport assembly to said second location and deflating said inflatable bladders to effect release of said article.

11. The article conveying apparatus of claim 10 wherein said inflatable bladders of the plurality of fingers are pneumatically controlled.

12. A method of packaging objects into a container comprising the steps of:
    (a) at least partially surrounding each of said objects to be placed into said container individually with at least two inflatable bladders;

(b) engaging a surface configuration of each of said objects by inflating said inflatable bladders to a relatively low pressure and thereby grip said objects;

(c) moving the inflated bladders such that said objects gripped thereby overlay said container; and (d) deflating said bladders to release said objects into said container.

13. The method as recited in claim 12 wherein the step of engaging said objects with said inflatable bladders comprises introducing a fluid into said inflatable bladders to increase their size.

14. A method as recited in claim 13 wherein the step of deflating said bladders comprises exhausting said fluid from said bladders to reduce their size.

15. A packaging apparatus comprising:

(a) a first endless conveyor for conveying items to be packaged;

(b) a second endless conveyor laterally offset from said first conveyor for conveying packaging containers, each having an open top;

(c) a transport head assembly disposed overhead relative to said first and second endless conveyor;

(d) a plurality of pairs of vertically oriented gripping fingers each finger having an inflatable bladder thereon for releasably grasping said items to be packaged, said gripping fingers depending from said transport head assembly, said transport head assembly having means for lateral and vertical reciprocating movement of said gripping fingers whereby items on said first conveyor can be transported to said containers on said second conveyor and released; and (e) release means on said transport head assembly for assisting in removal of said items from contact with said bladders of said gripping fingers, said transport head assembly having means for vertical reciprocation of said release means.

* * * * *